United States Patent
Li et al.

(10) Patent No.: US 11,455,261 B2
(45) Date of Patent: Sep. 27, 2022

(54) FIRST BOOT WITH ONE MEMORY CHANNEL

(71) Applicant: Intel Corporation, Santa Clara, CA (US)

(72) Inventors: Kevin Yufu Li, Shanghai (CN); Donggui Yin, Shanghai (CN); Zijian You, Shanghai (CN); Shihui Li, Shanghai (CN); Dujian Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/643,353

(22) PCT Filed: Sep. 29, 2017

(86) PCT No.: PCT/CN2017/104214
§ 371 (c)(1),
(2) Date: Feb. 28, 2020

(87) PCT Pub. No.: WO2019/061227
PCT Pub. Date: Apr. 4, 2019

(65) Prior Publication Data
US 2020/0364162 A1    Nov. 19, 2020

(51) Int. Cl.
*G06F 3/00* (2006.01)
*G06F 13/16* (2006.01)
*G06F 9/4401* (2018.01)
*G06F 13/40* (2006.01)

(52) U.S. Cl.
CPC ........ *G06F 13/1657* (2013.01); *G06F 9/4406* (2013.01); *G06F 9/4411* (2013.01); *G06F 13/1668* (2013.01); *G06F 13/409* (2013.01); *G06F 13/4068* (2013.01)

(58) Field of Classification Search
CPC .... G06F 9/4406; G06F 13/409; G06F 9/4411; G06F 13/1657; G06F 13/4068; G06F 13/1668; G06F 9/4401
USPC .......................................... 710/316
See application file for complete search history.

(56) References Cited

U.S. PATENT DOCUMENTS

| | | | |
|---|---|---|---|
| 6,079,016 A * | 6/2000 | Park | G06F 9/441 714/36 |
| 6,732,264 B1 | 5/2004 | Sun et al. | |
| 8,042,190 B2 | 10/2011 | Sahita et al. | |
| 2007/0157015 A1* | 7/2007 | Swanson | G06F 9/4401 713/2 |

(Continued)

FOREIGN PATENT DOCUMENTS

EP    1429253 B1    2/2008

OTHER PUBLICATIONS

International Search Report and Written Opinion for International Patent Application No. PCT/CN2017/104214, dated Jul. 6, 2018, 9 pages.

*Primary Examiner* — Chun Kuan Lee
(74) *Attorney, Agent, or Firm* — Jordan IP Law, LLC

(57) ABSTRACT

An embodiment of a semiconductor package apparatus may include technology to identify a partial set of populated memory channels from a full set of populated memory channels of a multi-channel memory system, and complete a first boot of an operating system with only the identified partial set of memory channels of the multi-channel memory system. Other embodiments are disclosed and claimed.

24 Claims, 9 Drawing Sheets

(56) References Cited

U.S. PATENT DOCUMENTS

| | | | |
|---|---|---|---|
| 2010/0070728 A1 | 3/2010 | Fujitsu et al. | |
| 2010/0325372 A1* | 12/2010 | Housty | G06F 13/1689 |
| | | | 711/E12.001 |
| 2011/0154006 A1 | 6/2011 | Natu et al. | |
| 2012/0191964 A1* | 7/2012 | Lee | G06F 11/2289 |
| | | | 713/2 |
| 2014/0351608 A1* | 11/2014 | Mozipo | G06F 1/3275 |
| | | | 713/300 |
| 2017/0115920 A1 | 4/2017 | Subramanian et al. | |
| 2018/0095806 A1* | 4/2018 | Aneja | G06F 11/00 |

* cited by examiner

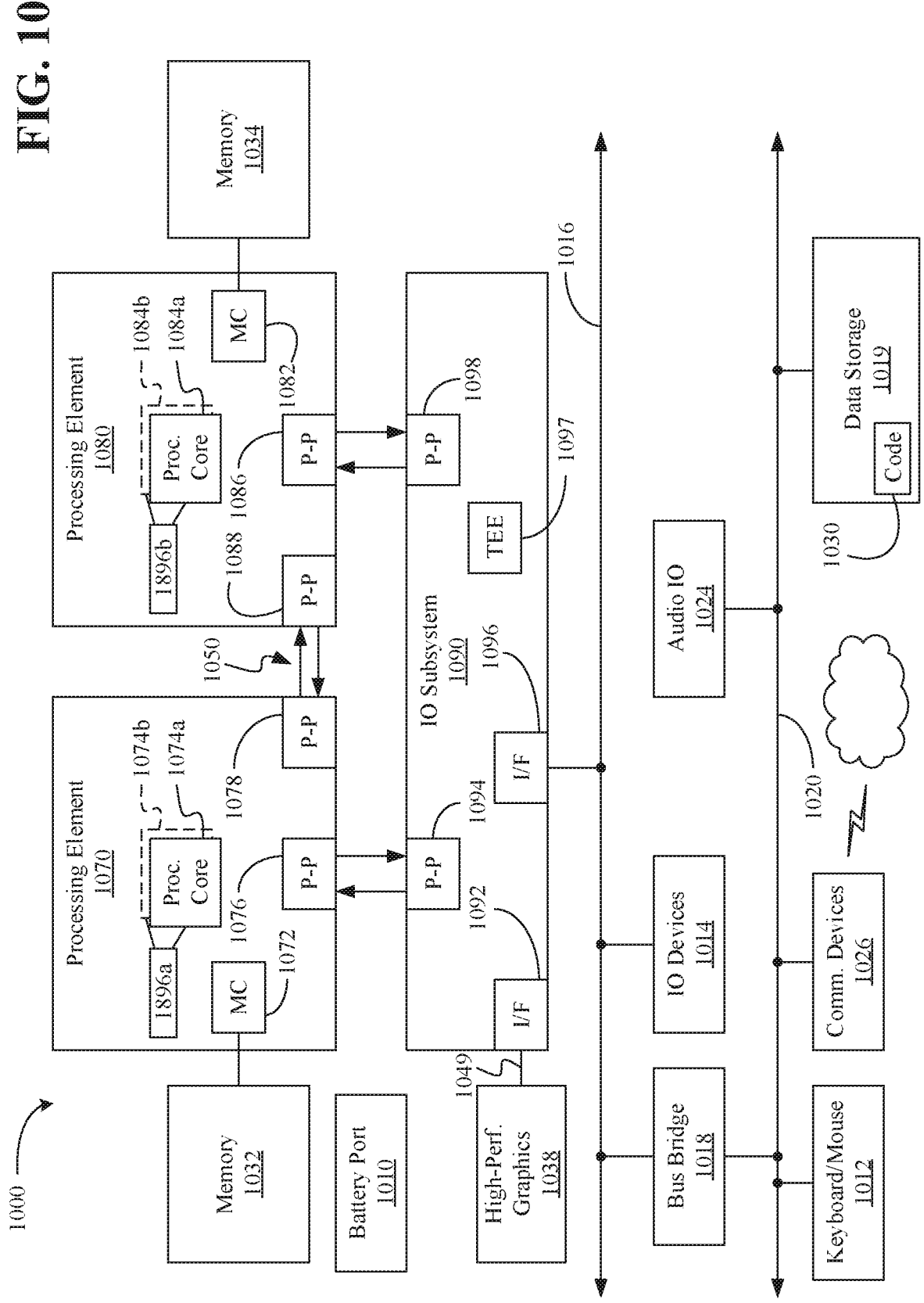

FIRST BOOT WITH ONE MEMORY CHANNEL

CROSS REFERENCE TO RELATED APPLICATIONS

The present application is a U.S. National Phase Patent Application, which claims the benefit of priority to International Patent Application No. PCT/CN2017/104214 filed on Sep. 29, 2017.

TECHNICAL FIELD

Embodiments generally relate to memory systems. More particularly, embodiments relate to a first boot with one memory channel.

BACKGROUND

In some memory systems, training is performed shortly after powering on the system. Training may include set up and calibration to get the various input/output (IO) interfaces ready to accept commands. For example, higher double data rate (DDR) speeds may require that dynamic random access memory (DRAM) channels be tuned for improved or optimum signal quality and DDR bus timing. This tuning is performed by the basic input/output system (BIOS) during boot up and may be referred to as DDR training.

BRIEF DESCRIPTION OF THE DRAWINGS

The various advantages of the embodiments will become apparent to one skilled in the art by reading the following specification and appended claims, and by referencing the following drawings, in which:

FIG. 10 is a block diagram of an example of a system according to an embodiment.

DESCRIPTION OF EMBODIMENTS

Figure 1:
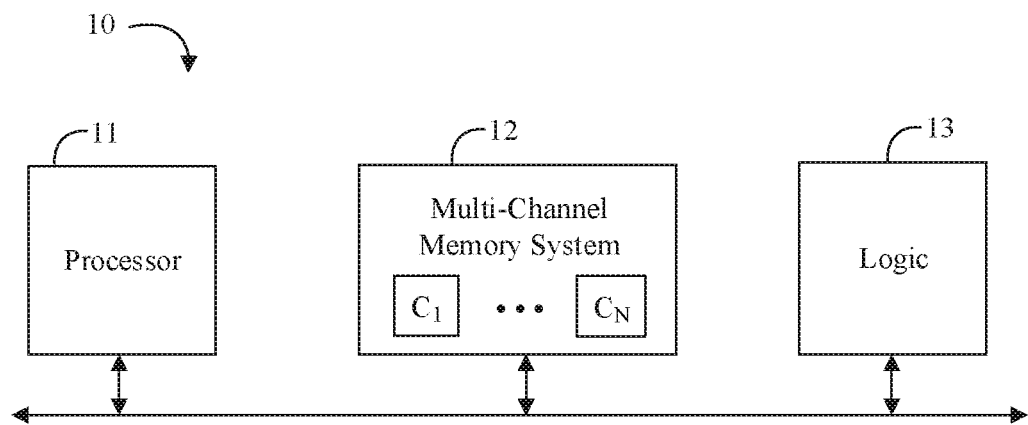
FIG. 1 is a block diagram of an example of an electronic processing system according to an embodiment.

Turning now to FIG. 1, an embodiment of an electronic processing system 10 may include a processor 11, a multi-channel memory system 12 communicatively coupled to the processor 11, and logic 13 communicatively coupled to the processor 11 to identify a partial set of populated memory channels from a full set of populated memory channels of the multi-channel memory system 12, and complete a first boot of an operating system with only the identified partial set of memory channels of the multi-channel memory system 12. For example, the multi-channel memory system may include N memory channels $C_1$ through $C_N$, where N is greater than 1. One or more of the memory channels $C_1$ through $C_N$ may be populated with one or more memory devices or components. In some embodiments, the logic 13 may be configured to identify one memory channel for the partial set of populated memory channels (e.g., a single memory channel populated with one or more memory devices). For example, the logic 13 may be configured to identify a first populated memory channel of the multi-channel memory system 12 as the one memory channel. In another example, the logic 13 may be configured to identify a first populated memory channel of the multi-channel memory system 12 with fewer memory components than a threshold as the one memory channel. In another example, the logic 13 may be configured to identify a least populated memory channel of the multi-channel memory system as the one memory channel. In some embodiments, the logic 13 may be further configured to online the other populated memory channels of the full set of populated memory channels after the first boot is completed.

Embodiments of each of the above processor 11, multi-channel memory system 12, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof.

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C # or the like and conventional procedural programming languages, such as the "C" programming language or similar programming languages. For example, the multi-channel memory system 12, persistent storage media, or other system memory may store a set of instructions which when executed by the processor 11 cause the system 10 to implement one or more components, features, or aspects of the system 10 (e.g., the logic 13, identifying a partial set of populated memory channels from a full set of populated memory channels of the multi-channel memory system 12, completing a first boot of an operating system with only the identified partial set of memory channels of the multi-channel memory system 12, etc.).

Figure 2:
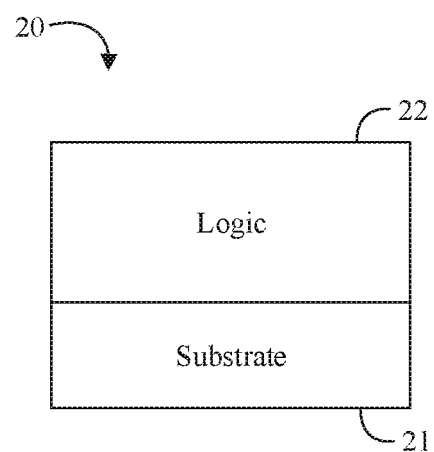
FIG. 2 is a block diagram of an example of a semiconductor package apparatus according to an embodiment.

Turning now to FIG. 2, an embodiment of a semiconductor package apparatus 20 may include a substrate 21, and logic 22 coupled to the substrate 21, wherein the logic 22 is at least partly implemented in one or more of configurable logic and fixed-functionality hardware logic. The logic 22 coupled to the substrate 21 may be configured to identify a partial set of populated memory channels from a full set of populated memory channels of a multi-channel memory system, and complete a first boot of an operating system with only the identified partial set of memory channels of the multi-channel memory system. In some embodiments, the logic 22 may be configured to identify one memory channel for the partial set of populated memory channels (e.g., a single memory channel populated with one or more memory devices). For example, the logic 22 may be configured to identify a first populated memory channel of the multi-channel memory system as the one memory channel. In another example, the logic 22 may be configured to identify a first populated memory channel of the multi-channel memory system with fewer memory components than a threshold as the one memory channel. In another example, the logic 22 may be configured to identify a least populated memory channel of the multi-channel memory system as the one memory channel. In some embodiments, the logic 22 may be further configured to online the other populated memory channels of the full set of populated memory channels after the first boot is completed.

Embodiments of logic 22, and other components of the apparatus 20, may be implemented in hardware, software, or any combination thereof including at least a partial implementation in hardware. For example, hardware implementations may include configurable logic such as, for example, PLAs, FPGAs, CPLDs, or fixed-functionality logic hardware using circuit technology such as, for example, ASIC, CMOS, or TTL technology, or any combination thereof. Additionally, portions of these components may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

Figure 3A:
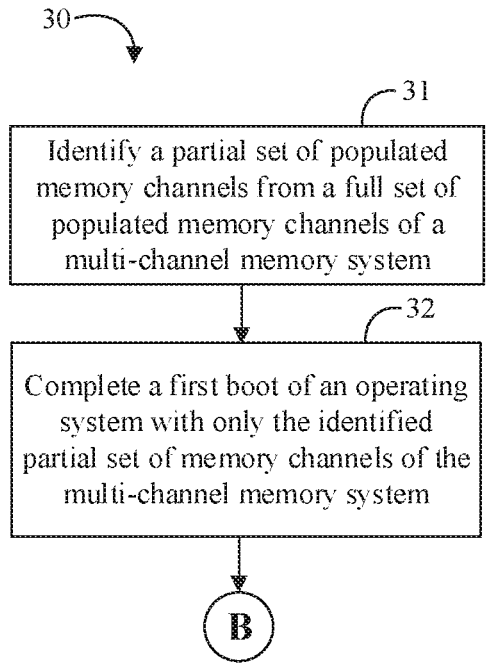
FIGS. 3A to 3B are flowcharts of an example of a method of booting an operating system according to an embodiment.
Figure 3B:
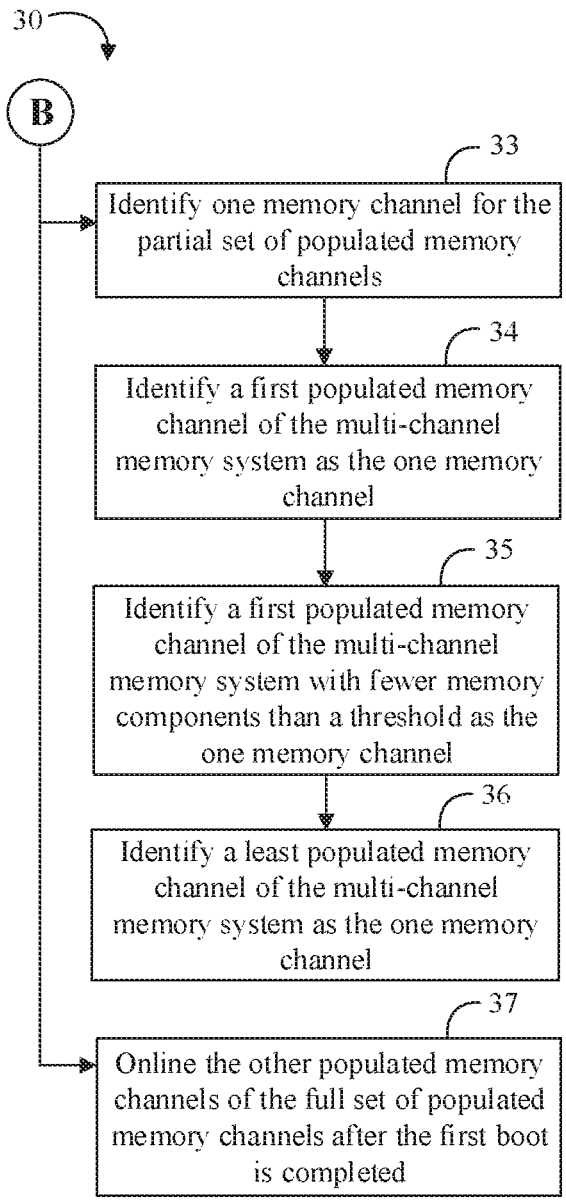

Turning now to FIGS. 3A to 3B, an embodiment of a method 30 of booting an operating system may include identifying a partial set of populated memory channels from a full set of populated memory channels of a multi-channel memory system at block 31, and completing a first boot of an operating system with only the identified partial set of memory channels of the multi-channel memory system at block 32. Some embodiments of the method 30 may include identifying one memory channel for the partial set of populated memory channels at block 33. For example, the method 30 may include identifying a first populated memory channel of the multi-channel memory system as the one memory channel at block 34. In another example, the method 30 may include identifying a first populated memory channel of the multi-channel memory system with fewer memory components than a threshold as the one memory channel at block 35. In another example, the method 30 may include identifying a least populated memory channel of the multi-channel memory system as the one memory channel at block 36. Some embodiments of the method 30 may further include onlining the other populated memory channels of the full set of populated memory channels after the first boot is completed at block 37.

Embodiments of the method 30 may be implemented in a system, apparatus, computer, device, etc., for example, such as those described herein. More particularly, hardware implementations of the method 30 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 30 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C # or the like and conventional procedural programming languages, such as the "C" programming language or similar programming languages.

For example, the method 30 may be implemented on a computer readable medium as described in connection with Examples 19 to 24 below. Embodiments or portions of the method 30 may be implemented in firmware, applications (e.g., through an application programming interface (API)), or driver software running on an operating system (OS).

Some embodiments may advantageously provide technology to make a basic input/output system (BIOS) first boot faster and/or to make boot time consistent. Some embodiments may provide a load reduced boot and/or a consistent load boot. A technical problem with many electronic systems is the time between turning the system on and when the system appears responsive to the user. In some electronic system, this time may be referred to as boot time. After power-on, the BIOS may control the boot process, eventually handing off control to the OS when the boot is completed (e.g., at which time the system may appear responsive to the user). During a first boot (e.g., turning on from a power off or complete shutdown state), the BIOS may perform dual-inline-memory-module (DIMM) timing training to deliver a stable memory access environment for the OS. In some other systems, this training time is highly dependent on the number of DIMMs populated on platform and may take a long time (e.g., memory timing training may take about 1.5 minutes on some 24 DIMM platforms with a release BIOS version, and even longer with a debug BIOS version). Advantageously, some embodiments may provide technology to reduce the boot time and/or to reduce or eliminate any dependency on the number of DIMMs populated on a platform.

Figure 4:
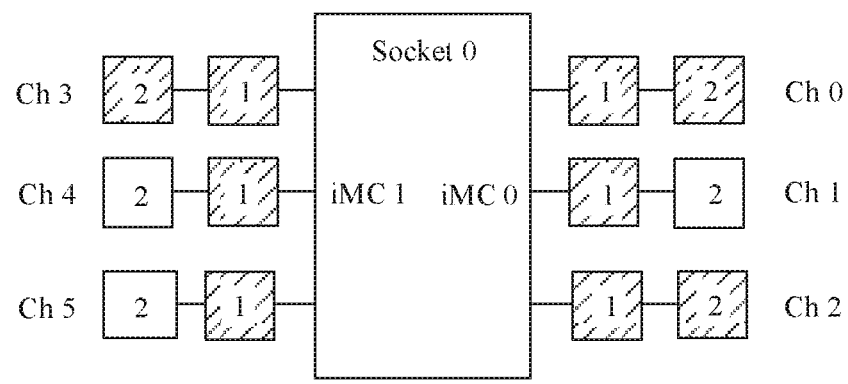
FIGS. 4 to 6 are illustrative block diagrams of an example of a multi-channel memory system according to an embodiment.
Figure 4:
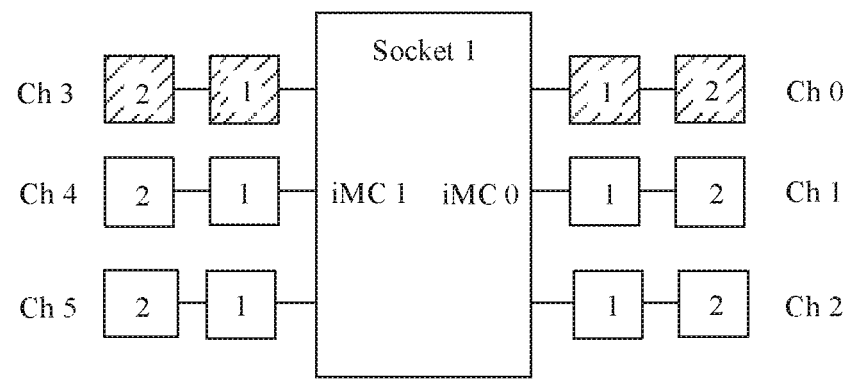

Turning now to FIG. 4, an embodiment of a multi-channel memory system 40 may include one or more sockets (e.g., socket 0, socket 1, and so on). Each socket may include multiple memory channels. For example, socket 0 may include memory channel 0 though memory channel 5, socket 1 may include memory channel 0 through memory channel 5, and so on. Each socket may also include multiple memory controllers coupled to respective memory channels. For example, socket 0 may include integrated memory controllers (iMC) 0 and 1, with iMC 0 configured to control memory channels 0 through 2 and iMC 1 configured to control memory channels 3 through 5. Likewise, socket 1 may include a respective iMC 0 and 1, with iMC 0 configured to control memory channels 0 through 2 and iMC 1 configured to control memory channels 3 through 5, and so on. Each memory channel may include multiple slots to install memory devices or components such as DIMMs. For example, each of the memory channels 0 through 5 of each of the sockets may include two slots (e.g., labeled in FIG. 4 as "1" and "2"). Accordingly, an embodiment of a platform utilizing the multi-channel memory system 40 may support two sockets, two iMCs per socket, three channels per iMC, and two memory slots per channel. Other embodiments may support more or fewer sockets, IMCs, memory channels, memory slots, etc. For illustration purposes, a hatch pattern for the memory slots represents a DIMM device installed in the memory slot, while a white box may represent an empty memory slot (e.g., no DIMM device installed).

In some other systems, the BIOS first boot may train the memory timing per socket in parallel. In a two-socket system, for example, overall training time may be roughly half as long as compared to training each socket sequentially. However, other systems may train all memory channels within a socket serially during the first boot. Other systems may also implement a memory online BIOS feature completely in a system management mode (SMM). For these other systems, both the BIOS first boot and the memory onlining may take a long time and result in an unfavorable user experience because the system appears unresponsive to the user during these periods. For example, when new DIMMs are added to the platform (e.g., similar to a memory hot-plug) other systems may run in SMM mode after the OS boot which may appear to the user that the OS is stuck and not running smoothly until the memory onlining is completed. Advantageously, some embodiments may provide technology to boot the OS with a reduced number of DIMMs trained and train the remaining DIMMs in a BIOS normal mode which allows the OS to remain responsive until the DIMMs are ready to be brought online.

In some embodiments, the BIOS may look for a memory channel with a minimum number of DIMMs populated, only train the DIMMs on the identified channel, and leave the rest of DIMMs untrained until the BIOS boot is done and after entering the OS. Then an OS driver may call a BIOS specific runtime service in a multi-thread mode to train the rest of the DIMMs in parallel. After all the DIMMs are trained, the system may enter an SMM mode to create a new memory map and online the DIMMs during OS boot or after the OS boot has completed. Advantageously, some embodiments may reduce BIOS boot time significantly. For the example platform of FIG. 4 with a full memory configuration (e.g., every memory slot populated with a DIMM device), the BIOS boot time will be about one-sixth (⅙) of the time as compared to some other systems. In some embodiments, the BIOS boot time may be less than approximately one-twelfth (1/12) of the time if there is only one DIMM on one channel while the rest of the channels are fully populated with DIMMs. Another advantage is that BIOS boot time may be more consistent because only one memory channel needs to be trained in the BIOS phase no matter how many sockets the platform supports. In some embodiments, advertising and/or messaging on the BIOS screen may advantageously be provided with a fixed display time to provide a consistent user experience.

Figure 5:
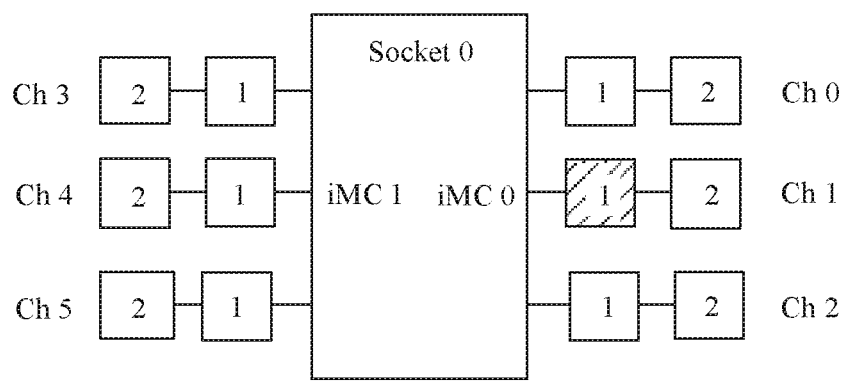
Figure 5:
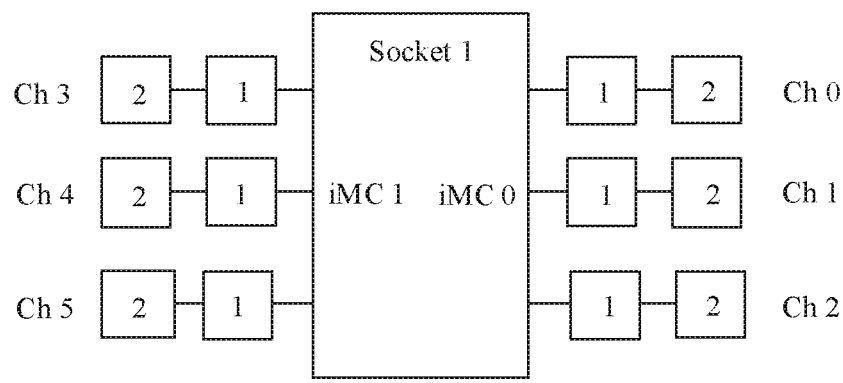

Turning now to FIG. 5, an illustrative example of memory training during a BIOS phase for the multi-channel memory system 40 may identify memory channel 1 of socket 0 as including the minimum number of DIMMs that may be populated in the platform's two-slot memory channels. For example, minimum and/or maximum thresholds may be set to aid the BIOS in identifying an appropriate memory channel to select for training during the BIOS phase. In a two-slot system, any channel populated with just one DIMM may be selected as corresponding to the least possible number of DIMMs in any channel (e.g., and accordingly requiring the least amount of training time). Because the memory channel 1 of the socket 0 is the first memory channel found with just one DIMM populated, that memory channel may be trained in the BIOS phase. For example, the platform central processor unit (CPU) and/or a memory controller may communicate with the DIMM devices over a system management (SM) bus. The DIMM may include a serial presence detect (SPD) chip which the CPU can read over the SM bus. The BIOS may include firmware or commands which instruct the CPU to scan each memory channel, from which the BIOS may identify the first channel which indicates that the channel is populated with the minimum number of DIMM devices (e.g., one DIMM in the example of FIG. 4). Some embodiments may identify further information about the DIMM devices and select the first boot memory channels based on the memory capacity of the populated DIMM(s) and/or other characteristics of the populated DIMM(s).

Figure 6:
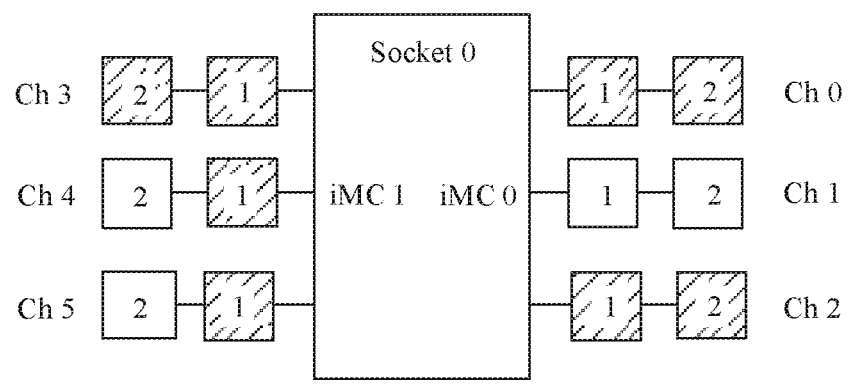
Figure 6:
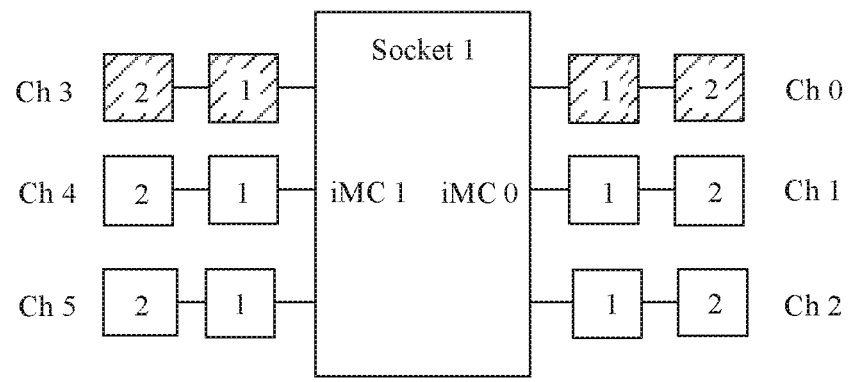

Turning now to FIG. 6, an illustrative example of memory training during an OS phase for the multi-channel memory system 40 may include the remaining DIMMs. In some other systems, the memory training time may correspond to the maximum time for any of the sockets trained in parallel (e.g., training time for nine (9) DIMMs populated in socket 0 for the example system of FIG. 4). In some embodiments, the BIOS may advantageously look for a memory channel with the minimum number of DIMMs populated. For the example system of FIG. 4, only socket 0 channel 1 (e.g., one (1) DIMM) is trained in the BIOS phase. The BIOS may only report the trained BIOS size to the OS, and the rest of the DIMMs may be trained in the OS phase.

Figure 7:
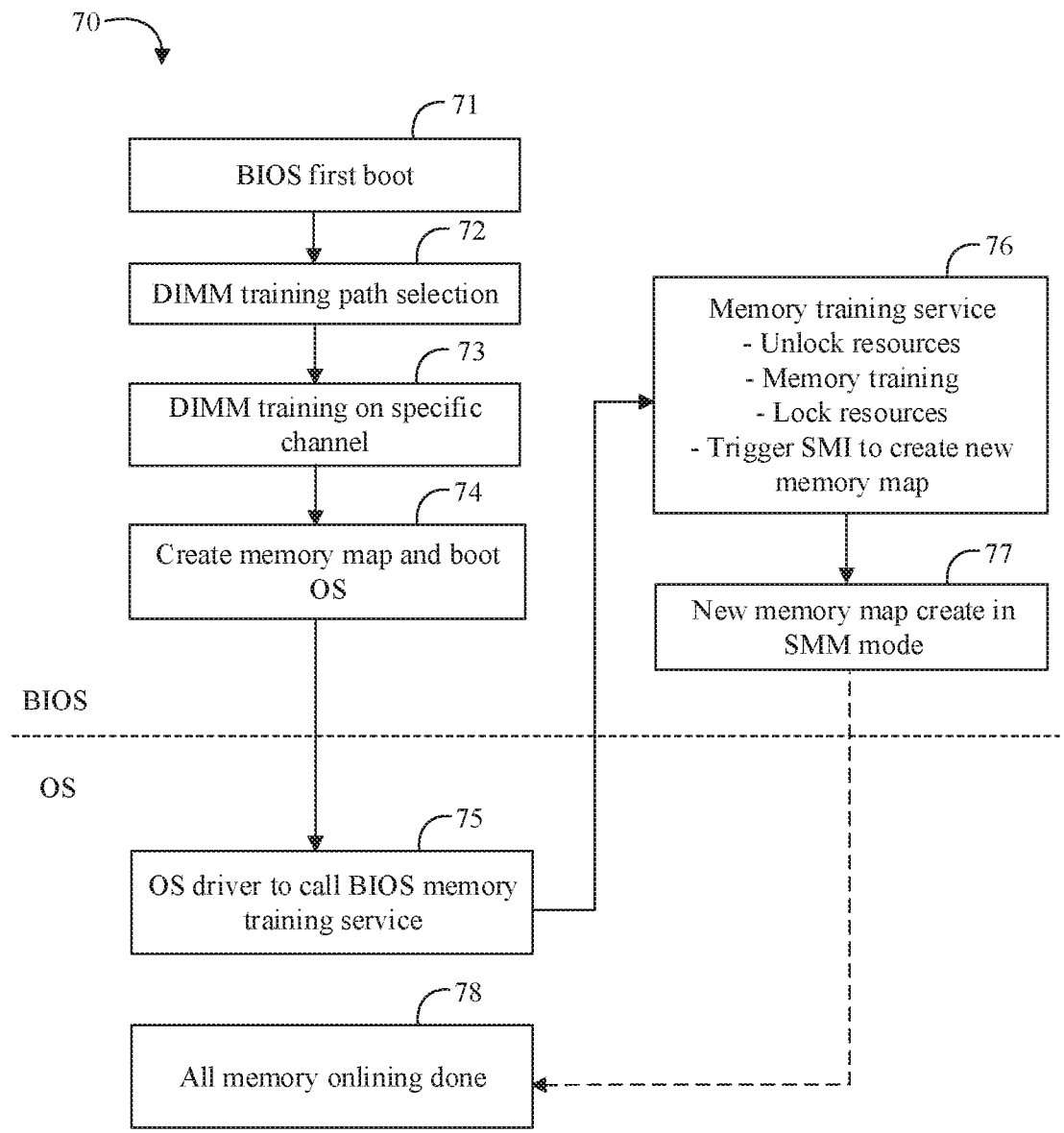
FIG. 7 is a flowchart of another example of a method of booting an operating system according to an embodiment.

Turning now to FIG. 7, an embodiment of a method 70 of booting an operating system may include initiating a BIOS first boot at block 71, and selecting a DIMM training path at block 72. For example, the method 70 may determine whether a load reduce mode is enabled or not from the BIOS setup. If enabled, the method 70 may scan the channels and return the channel number which has a minimum number of DIMMs populated. Alternatively, the method 70 may compare the number of DIMMs populated against a threshold and return the first channel number that satisfies the comparison (e.g., number of DIMMs populated=1; number of DIMMs populated >0 and <4; etc.). Alternatively, the method 70 may simply return the channel number for the first channel populated with any DIMMs. Depending on the platform configuration, any of a number of suitable criteria may be used to identify an appropriate memory channel or partial set of memory channels for training during the BIOS phase. In some embodiments, the number of memory channels and/or the selection/identification criteria may be configurable. If the load reduce mode is not enabled, the method 70 may abort and the first boot may train all DIMMs.

If a specific channel (e.g., or set of channels) is identified for training during the BIOS phase (e.g., a channel containing the minimum number of DIMMs), the method 70 may proceed to perform DIMM training on the specific channel(s) at block 73. The method 70 may then create a memory map and boot the OS at block 74. The memory map created at this point may only be based on the DIMM(s) on that specific channel. The method 70 may then move to the OS phase and an OS driver may call a BIOS memory training service at block 75. For example, the BIOS may provide an entry for the OS to execute specific memory training BIOS code. For example, the BIOS may provide a runtime service, or may reserve a space for a private service and convert it to virtual address for OS calling. In some embodiments, a chipset driver may trigger the BIOS memory training service. In some embodiments, the call to the BIOS memory training service may be similar to later added hot plug memory and may be initiated by a simulated hot plug event. Having an OS driver call the BIOS memory training entry allows execution in an OS multi-thread mode. Advantageously, the memory training may be executed on different CPU cores to train different channels in parallel. In some embodiments, the memory training function may be integrated into a chipset driver.

The method 70 may then perform the memory training service at block 76. This may be done in a BIOS normal mode (e.g., not SMM). The training service may unlock required resources, including but not limited to memory training hardware engine, CSRs, etc., and perform memory training on the remaining channels or DIMMs. Because the OS is unaware of untrained channels or DIMMs, some embodiments advantageously ensure there is no conflict on hardware access when the OS and the BIOS run in parallel. The memory service may lock resources after the memory training is done, and trigger a system management interrupt (SMI) to create new memory map. Advantageously, because the remaining memory training is done in BIOS normal mode rather than SMM mode the training may be executed in a multi-thread mode with reduced or minimum time latency and impact on user experience. Some embodiments may utilize this technique to provide a memory online BIOS feature outside of the first boot process to advantageously make memory onlining smoother when new DIMMs are added to the platform (e.g., starting with an OS driver call at block 75).

The SMI interrupt may cause the method to create a new memory map in SMM mode at block 77. Running in SMM mode may avoid hardware resources access conflict during the memory map rebuild. The method 70 may also perform an ADVANCED CONFIGURATION AND POWER INTERFACE (ACPI) table update for new memory map reported to the OS. Advantageously, the amount of time spent in SMM mode may be substantially less because the memory training has already been completed and may have little or no impact on the user experience. The method 70 may then leave the SMM mode and all memory onlining may be complete at block 78.

Figure 8A:
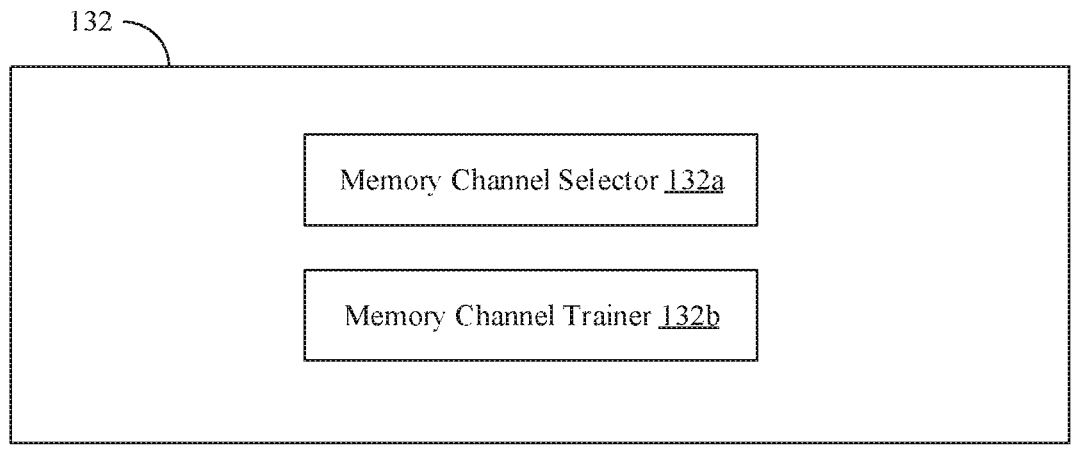
FIGS. 8A and 8B are block diagrams of examples of memory trainer apparatuses according to embodiments.

FIG. 8A shows a memory trainer apparatus 132 (132a-132b) that may implement one or more aspects of the method 30 (FIGS. 3A to 3B) and/or the method 70 (FIG. 7). The memory trainer apparatus 132, which may include logic instructions, configurable logic, fixed-functionality hardware logic, may be readily substituted for the system 10 (FIG. 1), already discussed. A memory channel selector 132a may identify a partial set of populated memory channels from a full set of populated memory channels of a multi-channel memory system, and a BIOS may complete a first boot of an operating system with only the identified partial set of memory channels of the multi-channel memory system. In some embodiments, the memory channel selector 132a may identify one memory channel for the partial set of populated memory channels (e.g., a single memory channel populated with one or more memory devices). For example, the memory channel selector 132a may identify a first populated memory channel of the multi-channel memory system as the one memory channel. In another example, the memory channel selector 132a may identify a first populated memory channel of the multi-channel memory system with fewer memory components than a threshold as the one memory channel. In another example, the memory channel selector 132a may identify a least populated memory channel of the multi-channel memory system as the one memory channel. In some embodiments, a memory channel trainer 132b may train and online the other populated memory channels of the full set of populated memory channels after the first boot is completed.

Figure 8B:
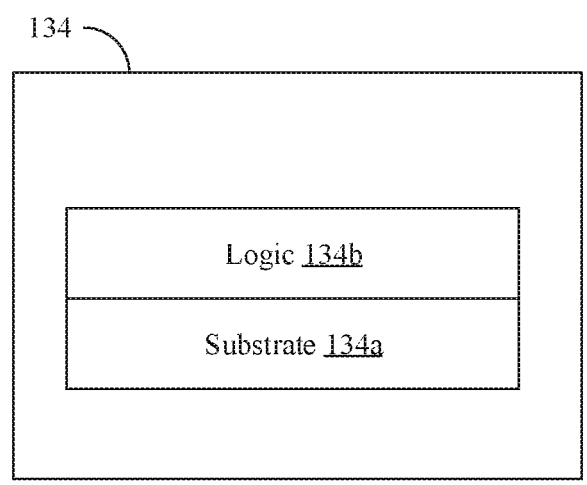

Turning now to FIG. 8B, memory trainer apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 30 (FIGS. 3A to 3B) and/or the method 70 (FIG. 7). Thus, the logic 134b may identify a partial set of populated memory channels from a full set of populated memory channels of a multi-channel memory system, and complete a first boot of an operating system with only the identified partial set of memory channels of the multi-channel memory system. In some embodiments, the logic 134b may identify one memory channel for the partial set of populated memory channels (e.g., a single memory channel populated with one or more memory devices). For example, the logic 134b may identify a first populated memory channel of the multi-channel memory system as the one memory channel. In another example, the logic 134b may identify a first populated memory channel of the multi-channel memory system with fewer memory components than a threshold as the one memory channel. In another example, the logic 134b may identify a least populated memory channel of the multi-channel memory system as the one memory channel. In some embodiments, the logic 134b may also online the other populated memory channels of the full set of populated memory channels after the first boot is completed. In one example, the apparatus 134 is a semiconductor die, chip and/or package.

Figure 9:
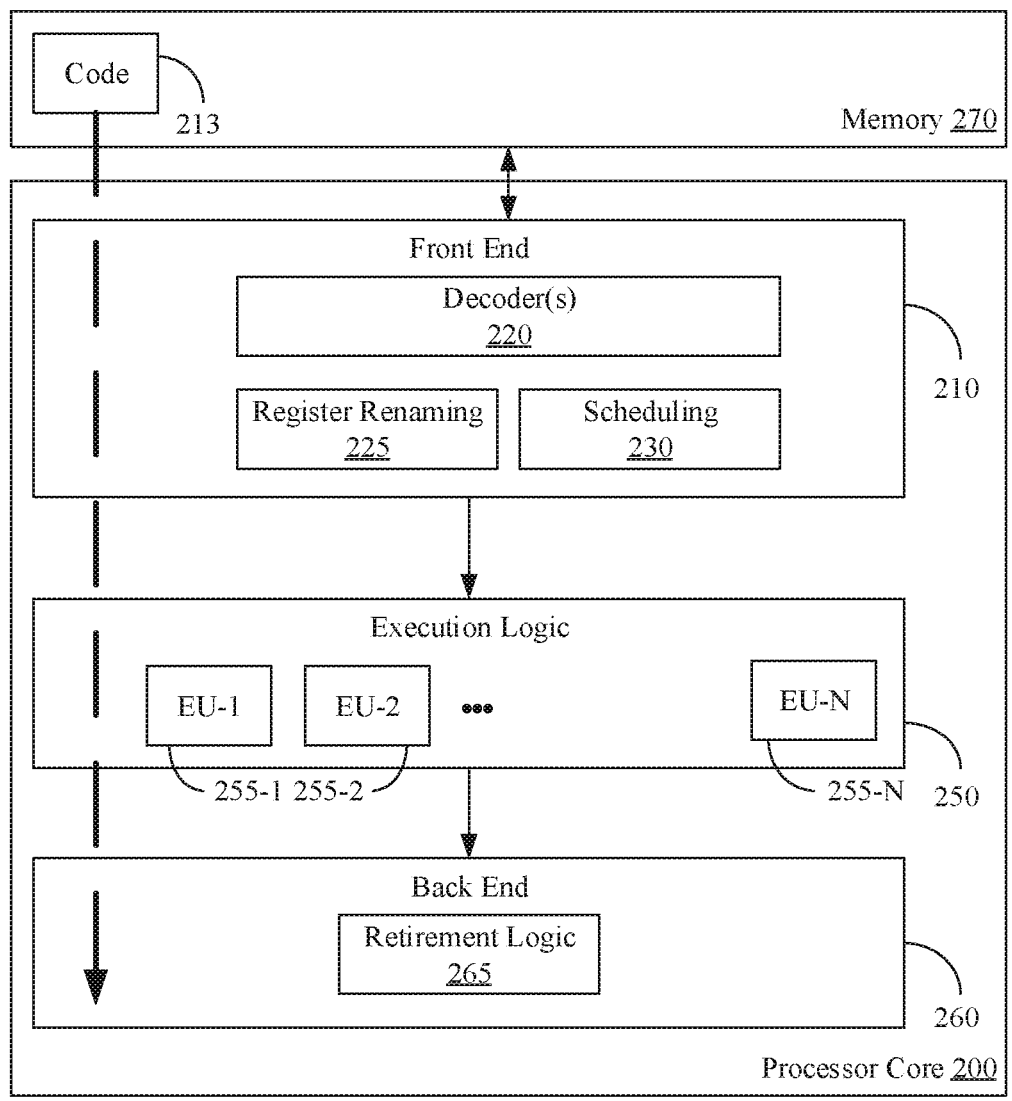
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 30 (FIGS. 3A to 3B) and/or the method 70 (FIG. 7), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 10, shown is a block diagram of a system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 30 (FIGS. 3A to 3B) and/or the method 70 (FIG. 7), already discussed, and may be similar to the code 213 (FIG. 9), already discussed. Further, an audio I/O 1024 may be coupled to second bus 1020.

Note that other embodiments are contemplated. For example, instead of the point-to-point architecture of FIG. 10, a system may implement a multi-drop bus or another such communication topology.

Additional Notes and Examples

Example 1 may include an electronic processing system, comprising a processor, a multi-channel memory system communicatively coupled to the processor, and logic communicatively coupled to the processor to identify a partial set of populated memory channels from a full set of populated memory channels of the multi-channel memory system, and complete a first boot of an operating system with only the identified partial set of memory channels of the multi-channel memory system.

Example 2 may include the system of Example 1, wherein the logic is further to identify one memory channel for the partial set of populated memory channels.

Example 3 may include the system of Example 2, wherein the logic is further to identify a first populated memory channel of the multi-channel memory system as the one memory channel.

Example 4 may include the system of Example 2, wherein the logic is further to identify a first populated memory channel of the multi-channel memory system with fewer memory components than a threshold as the one memory channel.

Example 5 may include the system of Example 2, wherein the logic is further to identify a least populated memory channel of the multi-channel memory system as the one memory channel.

Example 6 may include the system of any of Examples 1 to 5, wherein the logic is further to online the other populated memory channels of the full set of populated memory channels after the first boot is completed.

Example 7 may include a semiconductor package apparatus, comprising a substrate, and logic coupled to the substrate, wherein the logic is at least partly implemented in one or more of configurable logic and fixed-functionality hardware logic, the logic coupled to the substrate to identify a partial set of populated memory channels from a full set of populated memory channels of a multi-channel memory system, and complete a first boot of an operating system with only the identified partial set of memory channels of the multi-channel memory system.

Example 8 may include the apparatus of Example 7, wherein the logic is further to identify one memory channel for the partial set of populated memory channels.

Example 9 may include the apparatus of Example 8, wherein the logic is further to identify a first populated memory channel of the multi-channel memory system as the one memory channel.

Example 10 may include the apparatus of Example 8, wherein the logic is further to identify a first populated memory channel of the multi-channel memory system with fewer memory components than a threshold as the one memory channel.

Example 11 may include the apparatus of Example 8, wherein the logic is further to identify a least populated memory channel of the multi-channel memory system as the one memory channel.

Example 12 may include the apparatus of any of Examples 7 to 11, wherein the logic is further to online the other populated memory channels of the full set of populated memory channels after the first boot is completed.

Example 13 may include a method of booting an operating system, comprising identifying a partial set of populated memory channels from a full set of populated memory channels of a multi-channel memory system, and completing a first boot of an operating system with only the identified partial set of memory channels of the multi-channel memory system.

Example 14 may include the method of Example 13, further comprising identifying one memory channel for the partial set of populated memory channels.

Example 15 may include the method of Example 14, further comprising identifying a first populated memory channel of the multi-channel memory system as the one memory channel.

Example 16 may include the method of Example 14, further comprising identifying a first populated memory channel of the multi-channel memory system with fewer memory components than a threshold as the one memory channel.

Example 17 may include the method of Example 14, further comprising identifying a least populated memory channel of the multi-channel memory system as the one memory channel.

Example 18 may include the method of any of Examples 13 to 17, further comprising onlining the other populated memory channels of the full set of populated memory channels after the first boot is completed.

Example 19 may include at least one computer readable medium, comprising a set of instructions, which when executed by a computing device, cause the computing device to identify a partial set of populated memory channels from a full set of populated memory channels of a multi-channel memory system, and complete a first boot of an operating system with only the identified partial set of memory channels of the multi-channel memory system.

Example 20 may include the at least one computer readable medium of Example 19, comprising a further set of instructions, which when executed by the computing device, cause the computing device to identify one memory channel for the partial set of populated memory channels.

Example 21 may include the at least one computer readable medium of Example 20, comprising a further set of instructions, which when executed by the computing device, cause the computing device to identify a first populated memory channel of the multi-channel memory system as the one memory channel.

Example 22 may include the at least one computer readable medium of

Example 20, comprising a further set of instructions, which when executed by the computing device, cause the computing device to identify a first populated memory channel of the multi-channel memory system with fewer memory components than a threshold as the one memory channel.

Example 23 may include the at least one computer readable medium of

Example 20, comprising a further set of instructions, which when executed by the computing device, cause the computing device to identify a least populated memory channel of the multi-channel memory system as the one memory channel.

Example 24 may include the at least one computer readable medium of any of Examples 19 to 23, comprising a further set of instructions, which when executed by the computing device, cause the computing device to online the other populated memory channels of the full set of populated memory channels after the first boot is completed.

Example 25 may include a boot apparatus, comprising means for identifying a partial set of populated memory channels from a full set of populated memory channels of a multi-channel memory system, and completing a first boot of an operating system with only the identified partial set of memory channels of the multi-channel memory system.

Example 26 may include the apparatus of Example 25, further comprising means for identifying one memory channel for the partial set of populated memory channels.

Example 27 may include the apparatus of Example 26, further comprising means for identifying a first populated memory channel of the multi-channel memory system as the one memory channel.

Example 28 may include the apparatus of Example 26, further comprising means for identifying a first populated memory channel of the multi-channel memory system with fewer memory components than a threshold as the one memory channel.

Example 29 may include the apparatus of Example 26, further comprising means for identifying a least populated memory channel of the multi-channel memory system as the one memory channel.

Example 30 may include the apparatus of any of Examples 25 to 29, further comprising means for onlining the other populated memory channels of the full set of populated memory channels after the first boot is completed.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An electronic processing system, comprising:
    a processor;
    a multi-channel memory system communicatively coupled to the processor; and
    logic communicatively coupled to the processor to:
        identify a partial set of populated memory channels from a full set of populated memory channels of the multi-channel memory system,
        complete a first boot of an operating system with only the identified partial set of memory channels of the multi-channel memory system, and
        online the other populated memory channels of the full set of populated memory channels after the first boot is completed,
        wherein to complete the first boot of the operating system with only the identified partial set of memory channels comprises to perform a memory training operation during the first boot based on only the identified partial set of memory channels, and
        wherein to online the other populated memory channels of the full set of populated memory channels comprises to perform a memory training operation based on the other populated memory channels.

2. The system of claim 1, wherein the logic is further to: identify one memory channel for the partial set of populated memory channels.

3. The system of claim 2, wherein the logic is further to: identify a first populated memory channel of the multi-channel memory system as the one memory channel.

4. The system of claim 2, wherein the logic is further to: identify a first populated memory channel of the multi-channel memory system with fewer memory components than a threshold as the one memory channel.

5. The system of claim 2, wherein the logic is further to: identify a least populated memory channel of the multi-channel memory system as the one memory channel.

6. The system of claim 1, wherein to online the other populated memory channels of the full set of populated memory channels further comprises to call a basic input output system (BIOS) memory training service.

7. A semiconductor package apparatus, comprising:
    a substrate; and
    logic coupled to the substrate, wherein the logic is at least partly implemented in one or more of configurable logic and fixed-functionality hardware logic, the logic coupled to the substrate to:
        identify a partial set of populated memory channels from a full set of populated memory channels of a multi-channel memory system,
        complete a first boot of an operating system with only the identified partial set of memory channels of the multi-channel memory system, and online the other populated memory channels of the full set of populated memory channels after the first boot is completed,
wherein to complete the first boot of the operating system with only the identified partial set of memory channels comprises to perform a memory training operation during the first boot based on only the identified partial set of memory channels, and
wherein to online the other populated memory channels of the full set of populated memory channels comprises to perform a memory training operation based on the other populated memory channels.

8. The apparatus of claim 7, wherein the logic is further to:
identify one memory channel for the partial set of populated memory channels.

9. The apparatus of claim 8, wherein the logic is further to:
identify a first populated memory channel of the multi-channel memory system as the one memory channel.

10. The apparatus of claim 8, wherein the logic is further to:
identify a first populated memory channel of the multi-channel memory system with fewer memory components than a threshold as the one memory channel.

11. The apparatus of claim 8, wherein the logic is further to:
identify a least populated memory channel of the multi-channel memory system as the one memory channel.

12. The apparatus of claim 7, wherein to online the other populated memory channels of the full set of populated memory channels further comprises to call a basic input output system (BIOS) memory training service.

13. A method of booting an operating system, comprising:
identifying a partial set of populated memory channels from a full set of populated memory channels of a multi-channel memory system;
completing a first boot of an operating system with only the identified partial set of memory channels of the multi-channel memory system; and
onlining the other populated memory channels of the full set of populated memory channels after the first boot is completed,
wherein completing the first boot of the operating system with only the identified partial set of memory channels comprises performing a memory training operation during the first boot based on only the identified partial set of memory channels, and
wherein onlining the other populated memory channels of the full set of populated memory channels comprises performing a memory training operation based on the other populated memory channels.

14. The method of claim 13, further comprising:
identifying one memory channel for the partial set of populated memory channels.

15. The method of claim 14, further comprising:
identifying a first populated memory channel of the multi-channel memory system as the one memory channel.

16. The method of claim 14, further comprising:
identifying a first populated memory channel of the multi-channel memory system with fewer memory components than a threshold as the one memory channel.

17. The method of claim 14, further comprising:
identifying a least populated memory channel of the multi-channel memory system as the one memory channel.

18. The method of claim 13, wherein onlining the other populated memory channels of the full set of populated memory channels further comprises calling a basic input output system (BIOS) memory training service.

19. At least one non-transitory computer readable medium, comprising a set of instructions, which when executed by a computing device, cause the computing device to:
identify a partial set of populated memory channels from a full set of populated memory channels of a multi-channel memory system;
complete a first boot of an operating system with only the identified partial set of memory channels of the multi-channel memory system; and
online the other populated memory channels of the full set of populated memory channels after the first boot is completed,
wherein to complete the first boot of the operating system with only the identified partial set of memory channels comprises to perform a memory training operation during the first boot based on only the identified partial set of memory channels, and
wherein to online the other populated memory channels of the full set of populated memory channels comprises to perform a memory training operation based on the other populated memory channels.

20. The at least one non-transitory computer readable medium of claim 19, comprising a further set of instructions, which when executed by the computing device, cause the computing device to:
identify one memory channel for the partial set of populated memory channels.

21. The at least one non-transitory computer readable medium of claim 20, comprising a further set of instructions, which when executed by the computing device, cause the computing device to:
identify a first populated memory channel of the multi-channel memory system as the one memory channel.

22. The at least one non-transitory computer readable medium of claim 20, comprising a further set of instructions, which when executed by the computing device, cause the computing device to:
identify a first populated memory channel of the multi-channel memory system with fewer memory components than a threshold as the one memory channel.

23. The at least one non-transitory computer readable medium of claim 20, comprising a further set of instructions, which when executed by the computing device, cause the computing device to:
identify a least populated memory channel of the multi-channel memory system as the one memory channel.

24. The at least one non-transitory computer readable medium of claim 19, wherein to online the other populated memory channels of the full set of populated memory channels further comprises to call a basic input output system (BIOS) memory training service.

* * * * *